E. G. TURNER.
FRICTION-CLUTCH AND MEANS FOR OPERATING SAME.
APPLICATION FILED MAR. 12, 1913.

1,141,670.

Patented June 1, 1915.
4 SHEETS—SHEET 1.

WITNESSES:
M. J. Hekking.
Edwin D. Glenn.

INVENTOR:
Ernest G. Turner
by Robt. F. Kining
his attorney.

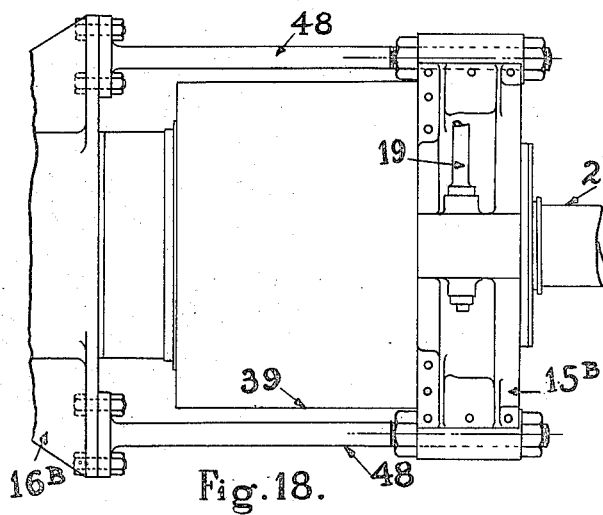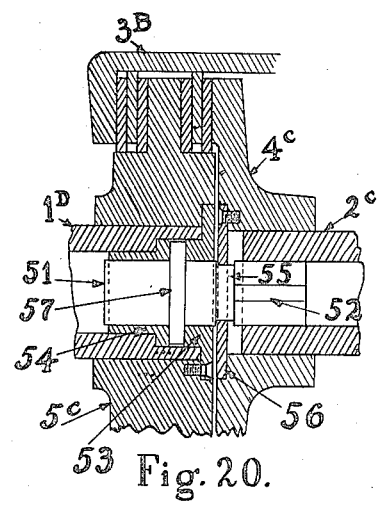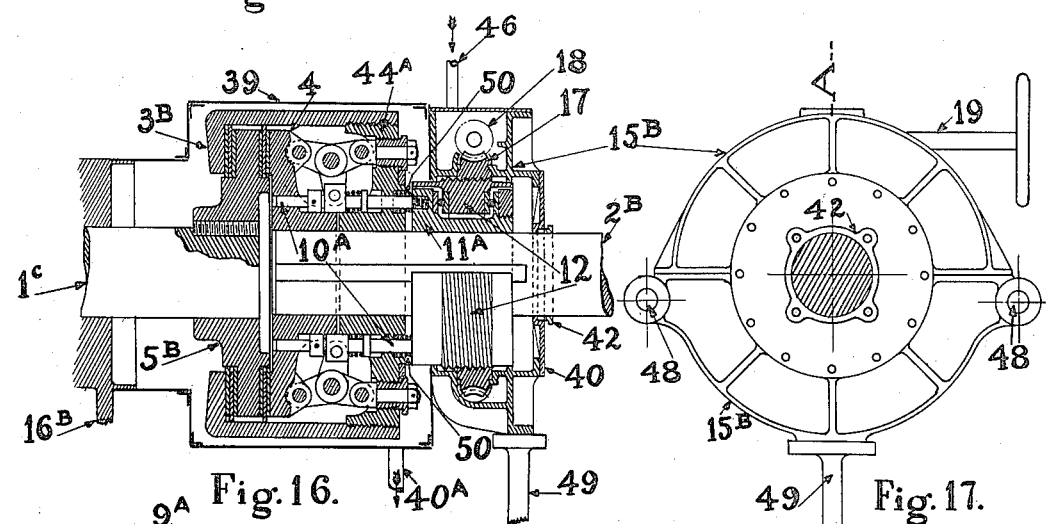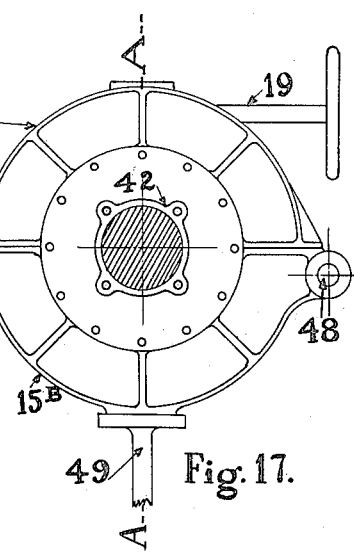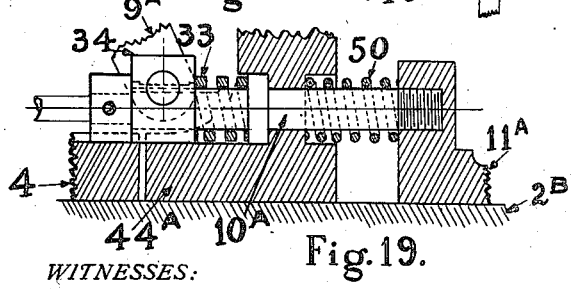

UNITED STATES PATENT OFFICE.

ERNEST G. TURNER, OF PHILADELPHIA, PENNSYLVANIA, ASSIGNOR OF ONE-HALF TO LUTHER D. LOVEKIN, OF PHILADELPHIA, PENNSYLVANIA.

FRICTION-CLUTCH AND MEANS FOR OPERATING SAME.

1,141,670.      Specification of Letters Patent.      Patented June 1, 1915.

Application filed March 12, 1913. Serial No. 753,805.

*To all whom it may concern:*

Be it known that I, ERNEST G. TURNER, residing in Philadelphia, in the county of Philadelphia and State of Pennsylvania, have invented certain new and useful Improvements in Friction-Clutches and in Means for Operating Same; and I do hereby declare that the following is a full, clear, and exact description thereof, reference being had to the accompanying drawings.

The object of this invention is to provide an improved clutch and of mechanism for operating same, and to this end the invention consists of the following described devices and combination of devices, as defined in the claims.

In the accompanying drawings which illustrate the invention, like characters indicate like parts throughout the several views; those shown in different adaptations of my said invention having letters of the alphabet suffixed to the numerals for like functioning parts, as those indicated by numerals only in the other views.

Figure 8:
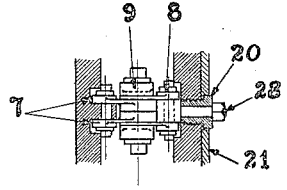
Figure 6:
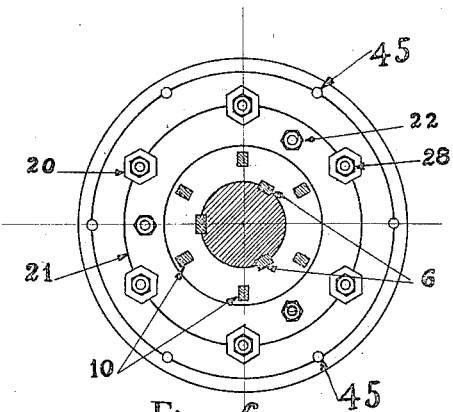
Figure 1:
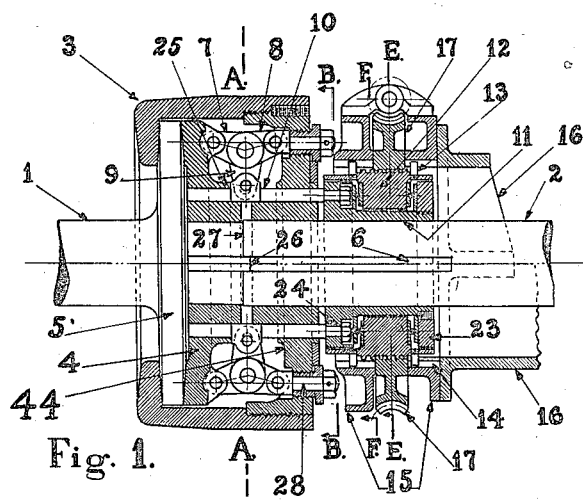
Figure 5:
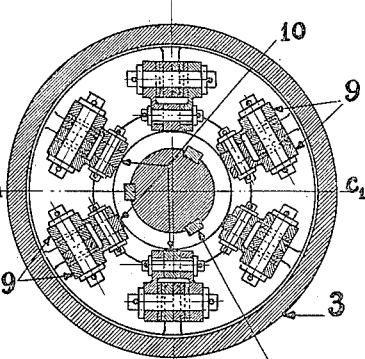
Figure 10:
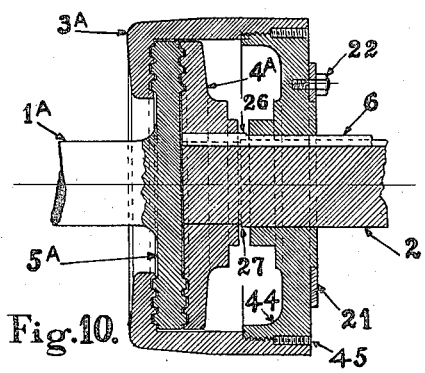
Figure 11:
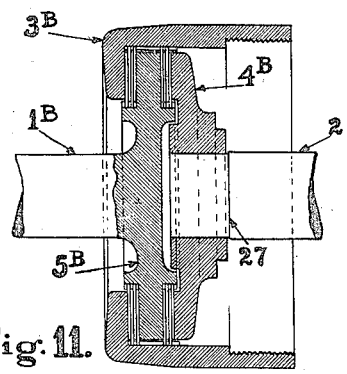
Figure 3:
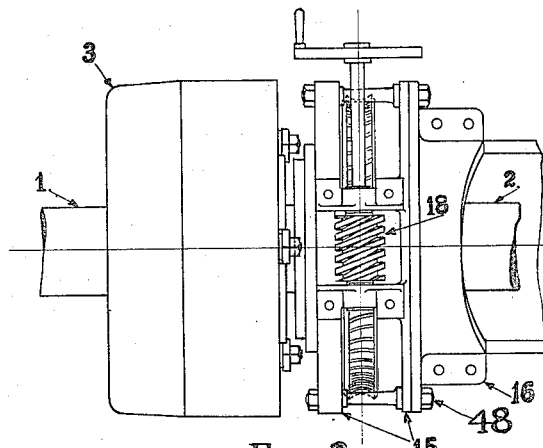
Figure 7:
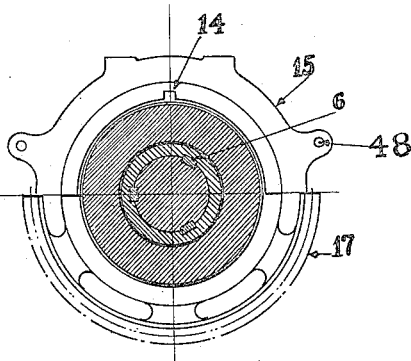
Figure 2:
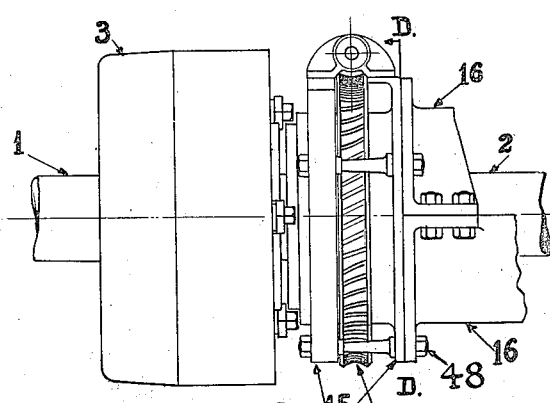
Figure 4:
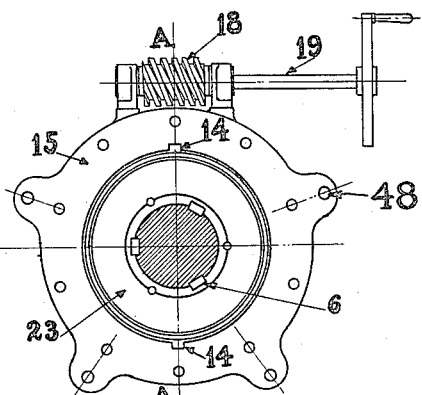
Figure 12:
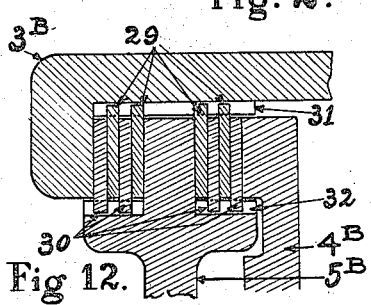
Figure 9:
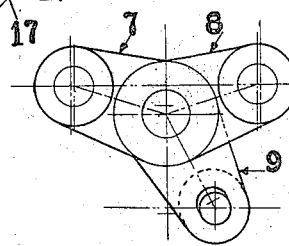
Figure 13:
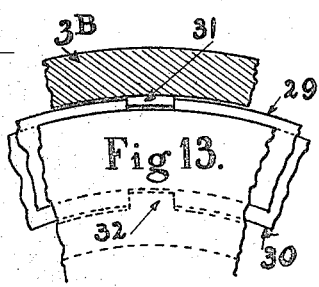
Figure 14:
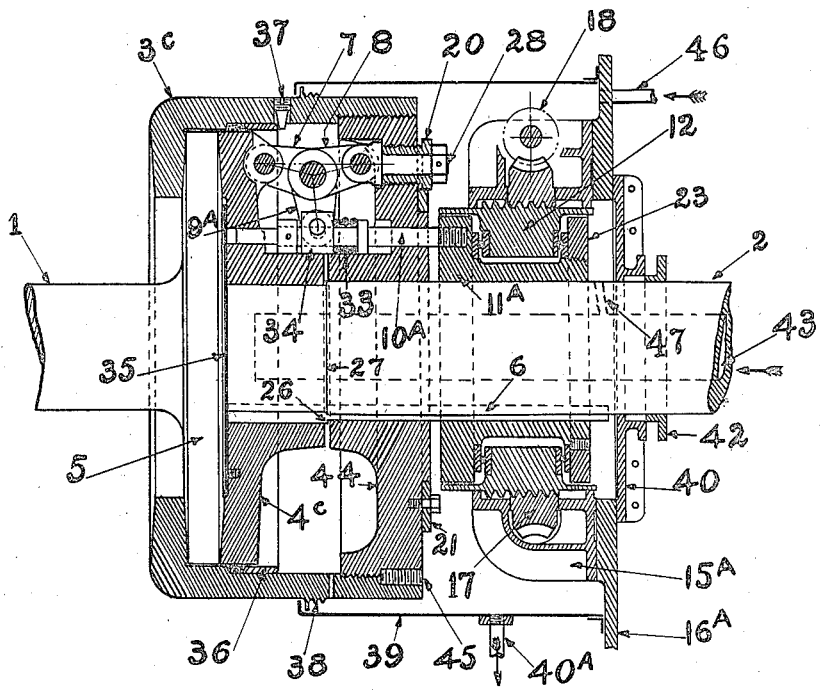
Figure 15:
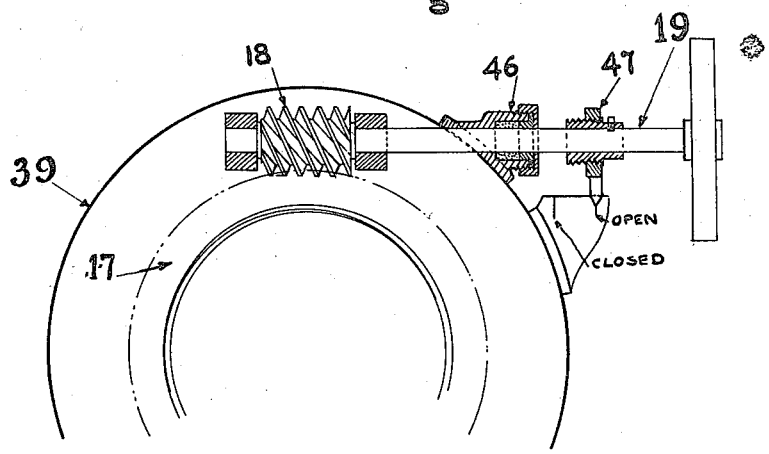

Referring to the drawings, Figure 1 is a vertical longitudinal sectional view of the device on line A—A of Fig. 4; Fig. 2 is a longitudinal exterior view in elevation of the device as shown in Fig. 1; Fig. 3 is an exterior view in plan, of the view Fig. 2; Fig. 4 is a vertical transverse view taken at the line D—D of Fig. 2; Fig. 5 is a vertical transverse section at line A—A of Fig. 1; Fig. 6 is a vertical transverse view at line B—B of Fig. 1; Fig. 7, in the lower half, is a transverse view in section at line E—E of Fig. 1, and in upper half, is a like view in section at line F—F of the same figure; Fig. 8 is a detail in plan view of the toggle levers 7 and 8, of which an enlarged view in elevation is shown in Fig. 9; Fig. 10 is a vertical longitudinal section at line $C^1$—$C^1$ of Fig. 5 and shows a V type or modified form of friction bearing surfaces of the device; Fig. 11 shows a similar view but of the multiple-disk type of friction bearing surfaces; Figs. 12 and 13 are enlarged detail views of the disk friction bearing surfaces shown in Fig. 11; Figs. 14 and 15, also 16, 17 and 18, show adaptations of the mechanical fed system of lubrication of the parts of my said invention together with modifications in minor details as hereinafter pointed out; Fig. 16 shows an elevation in section line at A—A of Fig. 17 and indicates an adaptation of my said invention to the conditions where there is longitudinal expansion in the driven shaft, and a corresponding movement of the supports of its end bearing next to and in the direction toward the driving shaft, thereby lessening the clearance between the ends of the two shafts, as in the case of marine engine installations in which, for example, the driving shaft is the crank-shaft of an auxiliary reciprocating engine and the driven shaft is that of the rotor of a main steam turbine engine, both engines when coupled together with my said improved clutch being in joint service rotating the propeller shaft of the ship; Fig. 17 is an end view in elevation of Fig. 16; Fig. 18 is a view in plan of Fig. 16; Fig. 19 is an enlarged detail of a part of Fig. 16, hereinafter more particularly described; Fig. 20 is a detail view of a modification of parts under the conditions mentioned respecting 16 and is hereinafter more particularly described.

The numerals 1 and 2 indicate two axially alined shafts, the former of which is assumed to be the driven member and the latter the driving member, both shafts being adapted to be coupled to and from each other by means of my said improved clutch and its operating mechanism. This clutch comprises two main clutch members 3 and 4, each provided with suitable friction bearing surfaces which, when the clutch is coupled, engages like surfaces of the member 5 of the driven shaft 1. The hubs of the two members 3 and 4 are fitted to the driving shaft 2 so as to be free to move on the shaft longitudinally and are provided with grooves or ways engaged by feathers or splines 6 attached to the shaft 2 for transmitting the rotary motion of the shaft to the clutch members 3 and 4, and are also adapted to cause an equalized lateral travel of said members 3 and 4 in their opening and closing movements for the purpose hereinafter described.

The radial webs of the members 3 and 4 are connected to and operated by a series of sets of toggle levers 7 and 8 which are engaged by links 9. These toggle-levers and links are located in sets placed equi-distant apart, circumferentially, as shown in Fig. 5, and are actuated by means of the rods 10 which are attached to and operated by the movable sleeve 11. This sleeve 11 is fitted to move on the shaft 2 longitudinally and is provided with grooves or ways engaged by feathers or splines 6 hereinbefore mentioned. The movement of the sleeve 11 along the shaft 2 longitudinally is effected by the side-wise movement of the non-rotating screw-threaded collar 12, which engages the flange-bearings 23 and 24 of the sleeve 11 by means of suitable bearing contacts, shown in Fig. 1 as being ball-bearing contacts. The sleeve 11 rotates with the shaft 2 but the screw-threaded collar 12 is non-rotating. This is accomplished by means of the projecting pin-bearings 13, or other appropriate means, rigidly attached to the screw-threaded collar 12 and are engaged by the grooves or ways 14, provided in the frame member 15, which is rigidly attached to the shaft pedestal or other fixed support 16. The screw-threaded exterior of the non-rotating collar 12 is engaged by a nut-like screw-thread provided within the hub of the worm-gear-wheel 17, which is actuated by the worm 18 to which motion is imparted by application of hand or mechanical power, as may be preferred, to its shaft 19, shown in Figs. 4 and 15.

For the purpose of causing the friction bearing surfaces of the members 3 and 4 to stand in open position equally clear from contact with the member 5, while the clutch is not in service, the opening travel of the members 3 and 4 is limited by means of stops 26 placed in the splines or feathers 6 and also by the shoulder 27 (shown in Figs. 11 and 14) placed on the shaft 2 by making the hub-seat of the member 4 of less shaft diameter than is that of the member 3. This limitation of opening movement will equalize the respective travel of those two members 3 and 4 and, when in full open position, will cause their friction bearing surfaces to stand clear of those of member 5 equally on both sides of same. I accomplish the same result in the construction shown in Figs. 16 and 18 by the use of the springs 33 and 50, shown in the enlarged detail Fig. 19.

For the purpose of increasing the area of the friction-bearing surfaces of the clutching members the method shown in Figs. 11 and 12 may be employed; in which 29 and 30 are flat rings of such number as may be needed to afford the desired bearing area, and of material suitable for the purpose, such for example as manganese bronze, the rings 29 being attached to the member $3^B$, and the rings 30 being attached to the member $5^B$, the attachments being made by means of the projections 31 and 32 spaced circumferentially equi-distant apart on the members $3^B$ and $5^B$ in such number and of such size as will afford the necessary strength for the purpose.

For the purpose of affording smoothness of operation sometimes the rods 10, of Fig. 1 are modified to that shown in rods $10^A$, of Fig. 14, and are provided with helical springs 33 of sufficient stress resistance as to transmit the required clamping stress from the rods $10^A$ to the links $9^A$ without closing the coils solid against each other.

Referring to Figs. 14, 15, 16 for the purpose of affording the employment of the forced system of lubrication to the bearing surfaces, (other than those of the clutch friction shoes or bearing surfaces) the clutch mechanism is incased by means of oil-tight casing walls 35, 39 and $40^A$, and are provided with appropriate oil retaining rings 38, and packing boxes and glands 36 and 42, as shown in Fig. 14, and member 46 of Fig. 15, the oil being introduced through suitable inlets 46 or 47, or both, and draining out at $40^A$.

The aforementioned forced system of lubrication forms no part of my said invention and no claims are therefor made thereon.

Provision for taking up the wear of the friction bearing surfaces of the members 3, 4 and 5, is provided by means of screw-threaded adjusting sleeves 20, engaging the toggle levers 8 through the eye-bolts 28; the pieces 20 being locked against becoming unscrewed by means of the lock-plate 21 attached to the member 44 by means of studs and nuts 22, as shown in Fig. 6. For purposes of assembling, the member 3 is made in two parts, the other part being marked 44, and are held together by threaded joint, as shown, and is prevented from becoming unscrewed by means of the threaded lock-pin 45. The packing gland 36 is adjusted by means of taper-pointed screws 37, or other suitable means.

In the adaptation of my said invention as shown in Figs. 16, 17 and 18, the frame $15^B$ supporting the operating gear 17 and 18 is rigidly attached to the turbine engine casing $16^B$ by means of stays 48, and is loosely supported vertically, by supports 49. This construction permits the clutch members 4 and $44^A$, and their operating gear to travel with the expansion movement of the member $5^B$ and the end of shaft $1^C$, such longitudinal expansion of the shaft $1^C$ and casing $16^B$ being caused by and is of extent according to the degree of the heat of the steam introduced into the turbine engine. Under these conditions of expansion the stops 26, and shoulder 27, (shown in Figs. 10, 11 and 14) are not employed and in their stead I use helical springs 50, encircling the rods $10^A$, (see Fig. 19), for the purpose of equalizing the opening travel of the driving disks, $3^B$ and 4, as shown in Fig. 16.

Referring to Fig. 20, which shows an alternative means which I sometimes employ for equalizing the opening travel of the members 3^B and 4^C under conditions of expansion of the shaft 1^D, for the purpose hereinbefore described, and which consists of shaft-pintle 51 provided with a spline 52 engaging the inside of the bore of the end of the shaft 2^C, by means of a groove or grooves, therein located for that purpose, for rotating the shaft-pintle 51 with the shaft 2^C, and which is adapted so that the shaft-pintle 51 will be free to move longitudinally within the shaft 2^C, according to and with the longitudinal expansion of the shaft 1^D with which it is engaged against longitudinal movement within the bore of the shaft by means of the bushings 53 and 54 engaging the collar 57, which is also provided on the shaft-pintle 51. The shaft-pintle 51 is also provided with a circumferential groove 55, the side of which acts as a stop engaging the flange 56 attached to the member 4^C. Owing to the longitudinal heat expansion of the shaft 1^D, the groove 55 is of width adapted to meet the maximum expansion travel of the shaft 1^D and its supporting casing 16^B hereinbefore mentioned.

The clutch described, as well as the means for operating the same, is especially adapted for the efficient transmission of large units of mechanical power.

The operation of the device is as follows:—By revolving the worm 18, through the means of its operating shaft 19, in the direction of which it is adapted for producing a movement of the non-rotating threaded collar 12 away from the clutch member 3 the sleeve 11 follows such movement and brings with it the attached rods 10 in the same direction together with the thereto attached end of the links 9 and thereby causing the toggle-levers 7 and 8 to close together in a folding-like movement and so causing a separating of the friction bearing surfaces of the members 3 and 4 from the bearing surfaces of the member 5 attached to the driven shaft, thus opening the clutch and leaving the two shafts disconnected, free and independent of each other. By reversing the direction of the rotary motion of the worm 18, from that just described, the movement of the threaded collar 12 and sleeve 11 moves toward the clutch member 3 and acting through the attached rods 10 and links 9 causes the toggle-levers 7 and 8 to open in an unfolding or straightening out movement thereby causing the friction-bearing surfaces of the members 3 and 4 to move toward each other and engaging the friction bearing surfaces of the member 5 with an intensity of pressure sufficient to transmit their rotary motion to that member and with it the shaft 1. By continuing the motion of the rods 10 to an extent sufficient to bring the attached end of the link 9 slightly past the point affording maximum travel of the toggle-levers, the clutch will remain locked without continuing the clamping stress on the rods 10 and thus avoid pressure, and consequent friction, between the bearing contact of the sleeve 11 and threaded collar 12 while the clutch is in service; or the adjustment of the links 9 with the rods 10 may be such that at the greatest required stress on the friction bearing surfaces of the members 3, 4 and 5, the links 9 will not have reached the point affording the maximum travel of the toggle-levers so that the closed position of the clutch during service must be maintained by the stress of the rods 10 holding the links 9 in the required position; this then is accomplished by means of stress from the worm 18 acting through the intermediate members, as above described.

What I claim and desire to secure by Letters Patent is:

1. A clutch mechanism and means for operating same, comprising a pair of driving disks engaged and actuated by a driving shaft and provided with friction-bearing clutch surfaces engaging in the closed or clutched relation similar surfaces on a driven disk, and a driven disk engaging a driven shaft and for actuating same and provided with friction bearing clutch surfaces engaged in the closed or clutch relation by the similar surfaces on said driving disks and actuated by the same, and a series of toggle levers engaging said driving disks in their clutching and unclutching movements and engaged by actuating links, and links engaging and actuating said toggle-levers and engaged by actuating rods, and rods engaging and actuating said links and engaged by an actuating sleeve, and a sleeve mounted on said driving shaft and engaging and actuating said rods and engaged by an actuating non-rotating screw-threaded collar, and a non-rotating screw-threaded collar engaging and actuating said sleeve and engaged by an actuating screw-threaded worm-gear, and a screw-threaded worm-gear engaging said collar and engaged by an actuating gear-worm, and a gear-worm engaging and actuating said worm-gear and engaged by an operating shaft, and an operating shaft engaging said gear-worm for actuating same, and a fixed bearing adapted for supporting said worm-wheel gearing and operating shaft aforesaid.

2. A clutch mechanism and means for operating same, comprising a pair of driving disks the hubs of which are provided with grooves engaged by splines attached to a driving shaft and with friction bearing clutch surfaces engaging in the closed or clutched relation similar surfaces on a driven disk, and splines attached to a driving shaft and in engagement with the grooves of said driving disks, and a driven disk engaging a driven shaft and for actuating same and provided with friction bearing clutch surfaces engaged in the closed or clutched relation by the similar surfaces on said driving disk and actuated by the same, and a series of toggle levers engaging said driving disks in their clutching and unclutching movements and engaged by actuating links, and links engaging and actuating said toggle-levers and engaged by actuating rods, and rods engaging and actuating said links and engaged by an actuating sleeve, and a sleeve mounted on said driving shaft and engaging and actuating said rods and engaged by an actuating non-rotating screw-threaded collar, and a non-rotating screw-threaded collar engaging and actuating said sleeve and engaged by an actuating screw-threaded worm-gear, and a screw-threaded worm-gear engaging said collar and engaged by an actuating gear-worm, and a gear-worm engaging and actuating said worm-gear and engaged by an operating shaft, and an operating shaft engaging said gear-worm for actuating same, and a fixed bearing adapted for supporting said worm-wheel gearing and operating shaft aforesaid.

3. A clutch mechanism and means for operating same, comprising a pair of driving disks the hubs of which are provided with grooves engaged by splines attached to a driving shaft and with friction bearing clutch surfaces engaging in the closed or clutched relation similar surfaces on a driven disk, and splines attached to a driving shaft in engagement with the grooves of said driving disks and provided with a stop for limiting the open travel of one of said pair of driving disks, and a driving shaft provided with a stop for limiting the opening travel of the other of said pair of driving disks, and a driven disk engaging a driven shaft and for actuating same and provided with friction bearing clutch surfaces engaged in the closed or clutched relation by the similar surfaces on said driving disks and actuated by the same, and a series of toggle levers engaging said driving disks in their clutching and unclutching movements and engaged by actuating links, and links engaging and actuating said toggle-levers and engaged by actuating rods, and rods engaging and actuating said links and engaged by an actuating sleeve, and a sleeve mounted on said driving shaft and engaging and actuating said rods and engaged by an actuating non-rotating screw threaded collar, and a non-rotating screw threaded collar engaging and actuating said sleeve and engaged by an actuating screw-threaded worm-gear, and a screw-threaded worm-gear engaging said collar and engaged by an actuating gear-worm, and a gear-worm engaging and actuating said worm-gear and engaged by an operating shaft, and an operating shaft engaging said gear-worm for actuating same, and a fixed bearing adapted for supporting said worm-wheel gearing and operating shaft aforesaid.

4. In a clutch mechanism for the transmission of mechanical power, an operating gear consisting of a worm-and-wheel gearing acting through a non-rotating screw-threaded collar in engagement with the wheel of said worm-and-wheel gearing, and said collar actuating a movable rotating sleeve in combination with means engaged by said sleeve and adapted for opening and closing said clutch mechanism by means of said operating gear.

5. In a clutch mechanism for the transmission of mechanical power, splines provided with stops in combination with a driving shaft provided with a stop said spline and shaft stops being adapted for equalizing the opening travel of the clutching elements of said mechanism, and clutching means adapted for the transmission of mechanical power from said driving to a driven shaft, and means for operating said clutching means.

6. A clutch mechanism and means for operating same, comprising a pair of driving disks engaged and actuated by a driving shaft and provided with friction-bearing clutch surfaces engaging in the closed or clutched relation similar surfaces on a driven disk, and a driven disk engaging a driven shaft and for actuating same and provided with friction bearing clutch surfaces engaged in the closed or clutched relation by the similar surfaces on said driving disks and actuated by the same, and a fixed bearing adapted for supporting said driven shaft, and means for opening and closing said driving disks, in combination with an operating gear therefor supported by a bearing attached to and carried by said fixed bearing which supports said driven shaft.

In testimony whereof, I have hereunto signed my name in the presence of two subscribing witnesses.

ERNEST G. TURNER.

Witnesses:
M. J. HEKKING,
EDWIN S. GLENN.